United States Patent [19]

Krueger

[11] Patent Number: 4,568,160
[45] Date of Patent: Feb. 4, 1986

[54] PROCESS AND APPARATUS FOR 3-DIMENSIONAL MOVING PICTURES

[75] Inventor: Lewis C. Krueger, Hamburg, N.Y.

[73] Assignee: MGS Incorporated, Gallatin, Tenn.

[21] Appl. No.: 639,553

[22] Filed: Aug. 10, 1984

Related U.S. Application Data

[63] Continuation-in-part of Ser. No. 500,704, Jun. 3, 1983, abandoned.

[51] Int. Cl.$^4$ .............................................. G03B 21/32
[52] U.S. Cl. ......................................... 352/86; 352/43
[58] Field of Search ................................... 352/43, 86

[56] References Cited

U.S. PATENT DOCUMENTS

| | | | |
|---|---|---|---|
| 1,580,242 | 4/1926 | Girsdansky | 352/86 |
| 2,056,600 | 10/1936 | Crosier | 352/65 |
| 2,104,779 | 1/1938 | Terwilliger | 352/43 |
| 2,146,135 | 2/1939 | Adams et al. | 352/86 |
| 2,161,120 | 6/1939 | Adler | 352/86 |
| 2,792,745 | 5/1957 | Wiber | 352/65 |

FOREIGN PATENT DOCUMENTS

| | | | |
|---|---|---|---|
| 794608 | 2/1936 | France | 352/86 |
| 1126066 | 11/1956 | France | 352/86 |
| 259341 | 10/1926 | United Kingdom | 352/86 |

Primary Examiner—Monroe H. Hayes
Attorney, Agent, or Firm—Biebel, French & Nauman

[57] ABSTRACT

Apparatus for recording a sequence of frames through a single lens system along different optical axes which exit the lens system along a common axis, and focus at a recording station, and which converge at a predetermined location in a scene to be recorded, comprises a recording station for film, or a photoelectronic scanner for video, a recording control providing for sequentially recording scenes focused at the recording station, and a lens system having a field of view encompassing scenes to be recorded and defining an optical path along which light rays pass from a scene and exit the lens system on a common axis to the recording station. A light shifting device is arranged to shift the optical path cyclically within the lens system between at least two different non-parallel axes which intersect at a predetermined location in a scene viewed by the lens system. Focus control provides for dynamically changing the intersection location of the axes of the different optical paths as the recording of scenes proceeds. The light shifting device may include a light refracting member or an iris piece which is shifted between different positions relative to the lens system axis in cyclic fashion synchronized to the recording control.

8 Claims, 7 Drawing Figures

PROCESS AND APPARATUS FOR 3-DIMENSIONAL MOVING PICTURES

CROSS-REFERENCE TO RELATED APPLICATION

This application is a continuation-in-part of application Ser. No. 500,704 filed June 3, 1983 and now abandoned.

BACKGROUND OF THE INVENTION

This invention relates to stereo or three-dimensional cinematography and video, e.g. to moving pictures and television which have an apparent depth of field dimension when viewed on an appropriate screen or similar display. The invention is particularly concerned with a process and apparatus which allows viewing without need for the viewer to wear special lens or optical filters to observe the third dimension effect.

The essential principles of three-dimensional cinematography have been known and described in various patents and other literature for most of this century, but a practical, consistent and acceptable process and apparatus has yet to achieve more than fleeting commercial success. The parlor "stereopticon" was well known around the end of the 19th century, and applications of the same fundamental stereo optics are found in two U.S. patents, Cervenka U.S. Pat. No. 1,163,892 of 1915 which resulted from work evidently done in France around 1911, and Hahn U.S. Pat. No. 1,282,073 of 1918, which appears to have an Australian origin around 1917.

The '892 patent features a fixed mirror d mounted at forty-five degrees to the optical centerline of a moving carmera lens b, and a movable mirror e supported in slide tracks i and moved toward and away from mirror d by a lever j which is controlled by a rotating cam k. The effect is shown in FIG. 1 and the resulting placement of successive picture frames on the film is shown in FIG. 5. It is also suggested that the lens b can be shifted back and forth to produce the result.

The '073 patent uses a central oscillating reflector 8, which pivots on a vertical axis 9–10 in front of lens 11 between spaced apart and fixed secondary reflectors 6 and 7 which are mounted at opposite sides of the lens axis. Motion of the central reflector is controlled by a cam 24, follower 21, and links 14 and 17, which allow the central reflector 8 to pause at the limits of its motion. A similar arrangement, using continuously orbiting pairs of reflectors is disclosed in Feil U.S. Pat. No. 1,929,685, and in French Pat. No. 794,608 of Feb. 21, 1936.

Of more recent vintage, McElveen U.S. Pat. No. 4,303,316 of 1981 discloses a single or double camera system. In the former, opposite sides of a lens 32 are alternatively blocked by a reciprocating shutter mechanism outside the front of the lens system as shown in FIGS. 5a and 5b, and a similar effect is used in the two camera systems, FIG. 6. Essentially the same arrangement, using reciprocating or rotating orifice plates in front of the lens, is disclosed in French Pat. No. 1,126,066 granted July 23, 1956.

Also, a number of commercially tried three-dimensional cinematography systems are described in detail in the April 1974 edition (Vol. 55, No. 4) of American Cinematographer magazine.

U.S. Pat. No. 2,135,049 to Harvey provides a system where a central reflector 24 rotates, or oscillates around the axis of the camera lens, and light from the scene is reflected by a rotating, or oscillating, secondary reflector 25. The angularity of the secondary reflector can be adjusted by the threaded rods 32, thus the reflectors can in a sense be focused upon some spot in a scene, but this adjustment can only be changed with the apparatus at rest, not dynamically. Also the motion of the secondary reflector is stated to be one revolution in thirty seconds (2 rev/min) or slower, for the ordinary cinema frame rate of twenty-four frames per second.

U.S. Pat. No. 2,101,979 to Brock discloses a system wherein sets of mirrors are amounted on a rotating disc or wheel BC', and rotated synchronously before the lens A' of a movie camera A. The optical result is described in the diagrams which comprise FIGS. 3, 4 and 5 of that patent.

U.S. Pat. No. 2,161,120 to Alder discloses a system in which a mirror 25 is carried and positioned by a damped armature piece, under the control of a set of electromagnet coils which are actuated according to the frame rate of the camera. U.S. Pat. No. 2,792,745 to Weber discloses a rotating mirror 3 with an aperture, driven in synchronism with the camera to reflect light into the camera lens. Behind the aperture a second mirror 16 provides a second light path to the lens. The space between the surfaces of these two mirrors determines the stereo separation or base, and is adjustable. Also the angularity of mirror 16 can be adjusted with respect to mirror 3, to adjust the stereo angle and thus adjust the point where the two light paths intersect, independently of the camera lens system.

U.S. Pat. No. 3,891,303 to Barquero considers the problem of binocular focusing, and suggests as a solution a system of reflectors which reverses side for side the scenes viewed by each eye, and uses visors fitted to the viewer to limit and direct his field of view.

SUMMARY OF THE INVENTION

The present invention provides forms of apparatus wherein successions of images are recorded alternatively along intersecting optical axes which are selectively directed through a single lens system, with the focal point or intersection of the optical axes being dynamically adjustable during performance of the process.

In one embodiment of the invention, this is achieved by refracting the light from the scene being recorded by a rotating an angularly adjustable refracting member. Therefore, the camera lens observes the scene alternately through the two opposed parts of the rotating angularly adjustable refractor, and the dynamic adjustment of that angle provides for the optical path of light coming from the scene to exit the lens system through two optical paths the center lines of which are slightly spaced and which intersect at the point in the scene where focus is desired. This point can be changed dynamically, as recording continues, through appropriate servo or similar controls. The technique which is embodied in this construction is susceptible to miniaturization, therefore it is possible through appropriate division of the multiple elements of the lens to have the refracting member actually embodied within the composite lens structure. This, of course, lends to substantial decrease in mass and inertia of the moving parts, and in turn provides for accurate and rapid response thereof, using a minimum amount of power.

Other embodiments utilize a similar light shifting arrangement but, in place of the refracting member an iris piece or pieces is mounted within the compound lens system. The aperture in the iris piece may be adjustable, or replaceable pieces with different apertures may be provided. The aperture in this iris piece is selected of a size substantially smaller than the unstopped aperture of the lens system.

The iris piece is mounted to be shiftable between at least two different viewing or frame taking locations on opposite sides of the centerline of the lens system, and the shifting action is achieved by linking an appropriate servo motor to the iris piece. This motor may then be driven at a desired rate which may be related to the frame rate, particularly in a moving picture camera.

In one version, the iris piece is shifted horizontally along a path transverse to the lens system centerline, and in another version this path is slightly oblique with respect to horizontal, so as to introduce a small amount of vertical disparity (in addition to horizontal) between the viewing locations of the iris piece aperture.

In each of the embodiments, the dynamic adjustment for depth of field can be achieved using the focusing arrangement (power or manual) of the lens system. Synchronization is achieved between the light shifting means and the frame recording mechanism of the camera, e.g. the shutter mechanism of a movie camera or the scanning drive of a video camera, by detecting the frame rate and, through appropriate electronic circuits, driving the servo motor to operate the light shifting member accordingly. For example, the timing and dwell of the light shifting means can be made an integral division of the frame rate. This is of greater importance in a movie camera than in a video camera, since in the latter the frame scan is progressive and some latitude can be tolereated in the timing of the light shifting means and the frame rate of the camera.

Accordingly the primary object of this invention is to provide a process and apparatus for three-dimensional cinematography and/or video, in which there is provided a dynamic adjustment for depth of field, or focus, with respect to a predetermined point or region in the scene being recorded; to provide such process and apparatus which lends itself to miniaturization and thus to incorporation in the optical system of a camera; to provide such a process and apparatus with closed loop servo controls which assure rapid and accurate movement and adjustment of the movable optical elements; and to provide such a process and apparatus by which moving pictures can be displayed, optically or by video means, without need for special equipment or viewer eye pieces, and without perceptible shaking or wobbling the pictures.

Other objects and advantages of the invention will be apparent from the following description, the accompanying drawings and the appended claims.

DESCRIPTION OF THE PREFERRED EMBODIMENT

Figure 1:
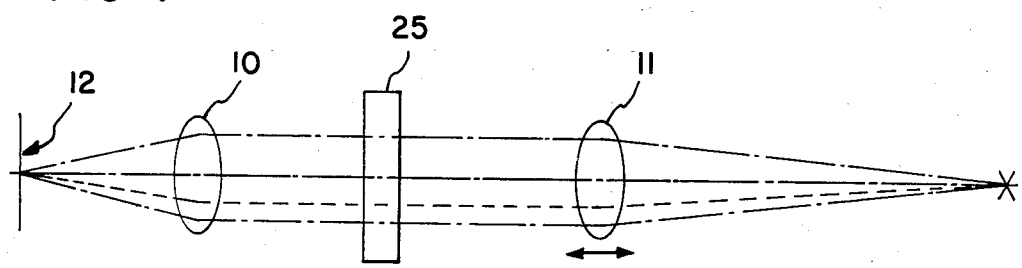
FIG. 1 is a diagram of the over all function of the process and apparatus.

Referring to FIG. 1 of the drawings, the lens system of a camera is indicated schematically as lens sections 10 and 11, and the image station of the camera is indicated at 12, at which station images of the distant scene 15 are focused for recording. For purposes of explanation, it will be understood that the camera may be either a moving picture camera of the type where images are recorded photographically in succession on film, or the camera may be of the video type where successive images are scanned on a photo sensitive member and recorded electronically, as for example in a conventional video tape recorder (not shown). In either event, mechanism and controls which are known per se provide for the synchronized sequential recording of frames, that is sequential images of the scene. The normal frame rate for moving picture films is twenty-four frames per second, and the normal frame rate for video is thirty frames per second.

Light rays from the scene pass through front lens section 11 and through optical shifting means which are the subject of this invention, then through the rear lens section 10 of the system to the image recording station 12. In order to produce a three dimensional effect, the scene is viewed by the lens system from two different positions, in a predetermined sequence, and the center lines of these optical paths are indicated by the dot-dash line 20 and the dash line 22. It has been discovered that in order to avoid objectional movement in the viewing of the sequentially recorded frames from these two different paths, it is necessary to have the paths non-parallel, and to have the paths focus or intersect at a predetermined location in the scene which is indicated by the letter X in FIG. 1. Thus for example if a figure or an object is the central point of the scene, it is desired that the two optical paths intersect at that object, and that this relationship be maintained as the object moves toward or away from the camera within the scene being viewed. It has been discovered that by maintaining this relationship between the two center lines of the light paths in a dynamic fashion, that is while the camera is functioning to record, the previously noted wobble or shaking of the recorded scenes, when reproduced by projection onto a screen, or on a television monitor or set, is eliminated.

Thus, the basic arrangement of the system involves the shifting or redirection of the two light paths to produce frames of scenes recorded along a plurality of different paths in a predetermined sequence, while maintaining the intersection of the center line of these paths at the focal object of the scene being recorded. This can be accomplished by various types of shifting optical members, as hereinafter explained, and the arrangement is shown in a general graphical manner in FIG. 1, where the two light paths pass through a refracting member 25 between the lenses of the optical system.

Figure 2:
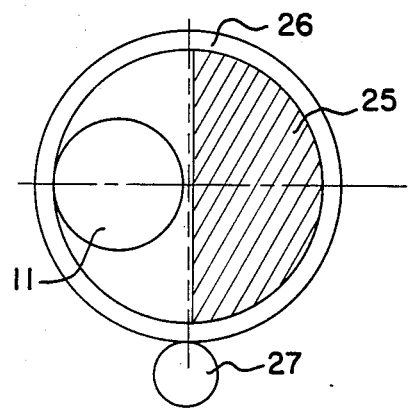
FIGS. 2 and 3 are schematic front and side views, respectively, of a refractomg form of apparatus for accomplishing light shifting.
Figure 3:
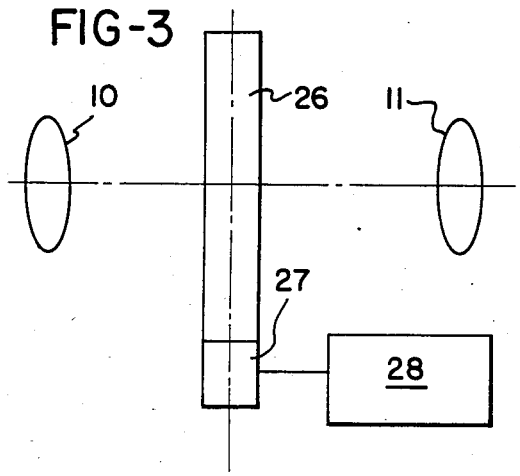

The invention thus lends itself to miniaturization, and incorporation into a compound lens system, as shown schematically in FIGS. 2 and 3. The lens system is illustrated as including the first lens section 11 and a second lens section 10, mounted in spaced apart relationship within a suitable enclosure which is not shown. Between these two lens sections there is the refracting member 25 which may be constructed in the form of a semi-circular light refracting member of known index of refraction, supported in a ring 26. The ring is supported for rotation in a plane transverse to the optical axis of the lens system, and the center line or axis of rotation of the ring, and thus of the refracting member 25, is offset to one side of the axis of the lens system as shown in FIG. 2. Furthermore, the size and angular extent of the refracting member (and hence of the ring) is selected such that the refracting member may be positioned between the sections of the lens system for a time sufficient to permit recording of the desired sequence of frames viewed along one light path, for example three successive frames.

Therefore, when the refractor member 25 is located in the optical path, the direction of the functioning optical path for recording purposes will be, for example, along the dash line 22 in FIG. 1, and when the refractor is out of the optical path, it will be as indicated by the dot-dash line 20. Thus, two or three frames of the sequence will be recorded as viewed through the refractor 30, and two or three frames next recorded as viewed without the refractor in the optical path. The angularity of the refractor 25 with respect to the center line of the light path 22 can be varied by a controller, thereby providing dynamic adjustment of the focal point upon the object in the scene, or alternatively the standard focusing adjustment of the lens system can be used.

Since the other half of the ring 26 is open, the lens system functions with the refracting member removed from it for the half-revolution during which the open side of the ring is located between the lens sections. The ring 26 is rotated at a predetermined speed by a driving roller or gear 27 which is in turn driven by a servo motor 28. The ring and this driving mechanism (preferably) is mounted for tilting movement about a vertical axis 30, as indicated by the double ended arcuate arrow 31, to permit adjustment of the angularity of the refracting member 25 with respect to the optical access of the lens system.

Figure 4:
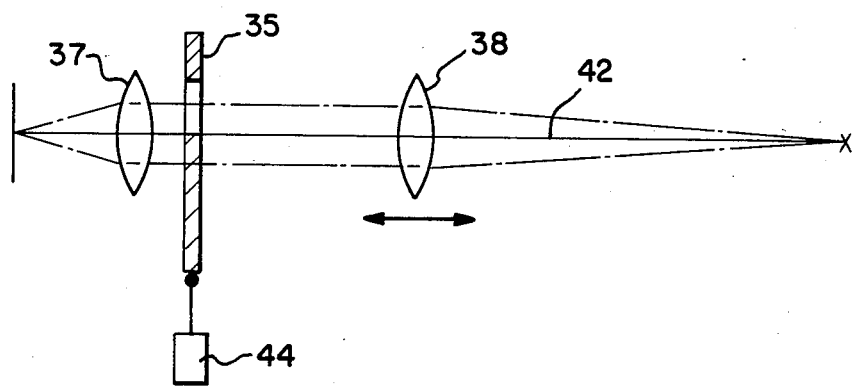
FIGS. 4 and 5 are schematic front and side views of another embodiment using a shifting iris piece.

FIG. 4 is a plan view of another embodiment of the invention, in which the light shifting means is in the form of a movable iris piece 35 which is mounted within the compound lens system of the camera, including sections 37 and 38, for example as a replacement for the usual adjustable aperture iris. The aperture 40 in piece 35 may be of a fixed size, in which case replaceable pieces may be utilized to alter the iris size and the "f" stop of the lens system, or an adjustable iris member may be incorporated in the piece 35.

Figure 5:
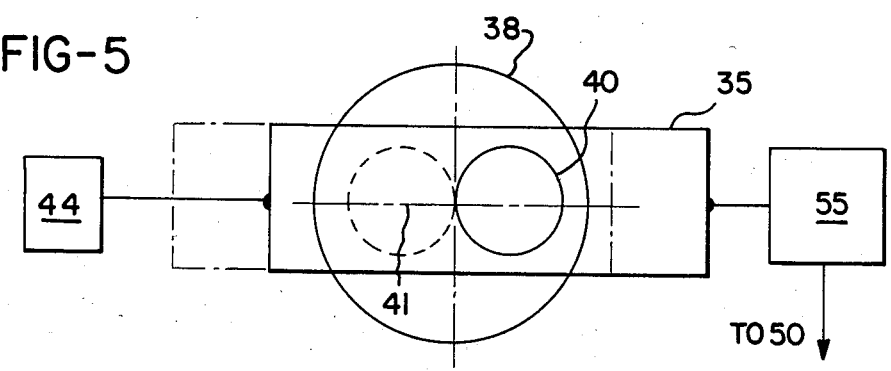

As shown in FIGS. 4 and 5, the iris piece is shiftable along the transverse horizontal axis 41 of the lens system between at least two different locations relative to the centerline 42 of the lens system. This is accomplished by the servo motor 44, which is appropriately linked to the iris piece 35. Because this shifting of the optical path occurs within the lens system, it is possible to utilize the focusing arrangement of the lens system for dynamically controlling the convergence of the different light paths at the desired point in the scene.

Figure 6:
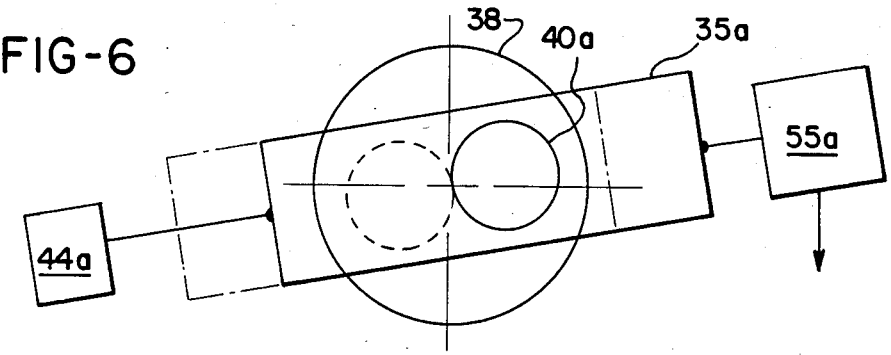
FIG. 6 is a schematic view of a modification of the embodiment shown in FIGS. 4 and 5.

FIG. 6 shows a modified version of the embodiment of FIGS. 4 and 5, wherein the same references with suffix a are used to designate like parts. Here, the iris piece 35a is mounted to move along a path somewhat oblique to the horizontal transverse axis 41a of the lens system, for example at an angle of less than 30° to the horizontal line. Thus, in the two different frame taking positions, there is some vertical disparity. This has been found to enhance the three-dimensional effect, particularly in recording panoramic scenes or the like where there is no dominant object in the scene within the depth of field of the lens system.

Figure 7:
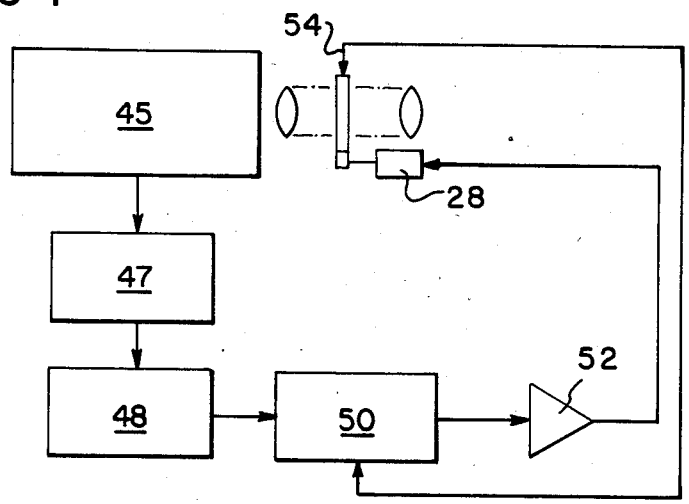
FIG. 7 is a block diagram of a control circuit for driving the movable optical elements.

FIG. 7 is a block diagram illustrating a control system by means of which the camera is synchronized with the light shifting means for the purpose of allowing the sequential recording of frames along the different optical paths, for example three frames being recorded along one path, then three frames recorded along the other path, etc. Conventional moving picture cameras provide an electrical triggering pulse for each frame that is recorded. In similar fashion, electronic pulse signals are available to indicate the timing of frames recorded in a video camera. Thus, the camera 45 is exemplary of either a cinematographic (movie) or a video camera. The output pulses, at the frame rate, are directed to a pulse shaping circuit 47, and from the pulse shaper the string or chain of pulses is directed to an adjustable time delay circuit 48. This circuit is of a conventional type, and merely provides control of the phase of the pulses in the string with respect to the ultimately desired operation of the servo motors.

The string of output pulses, appropriately shaped and delayed as necessary, is directed into a divider counter 50 which divides the frame rate pulses by an integral number equal to the number of frames desired to be recorded along each optical path in the sequence. For example, if it is desired to record three frames along one optical path, and the next three along another optical path, in a moving picture camera system operating at the usual twenty-four frames per second, then the output control pulses from the divider counter 50 will be at eight pulses per second, each pulse signaling the movement of the light shifting means to another position. These control pulses are directed to a servo amplifier 52, which in turn provides output signals to the appropriate servo motor 28 or 44 of the light shifting means.

In the embodiment shown in FIGS. 2 and 3 this would be the servo motor 28 to assure that it rotates at the proper speed, and in the embodiment shown in FIGS. 4 and 5 this would be the shifting servo motor 44. It may be desirable to provide a closed loop servo arrangement, thus in the case of the rotary servo motors 28, there will be an appropriate pickup transducer 54 on the device it is driving, e.g. the ring 26, which will provide a positional signal back to the servo amplifier 82.

In the case of the linear acting servo motor 44 it has been found that a suitable fast response servo motor device can be constructed using the driving coil and permanent magnet of an audio load speaker. The iris piece 35 is suitably linked to the moving coil of the loud speaker, and the output of the servo amplifier is directed to the windings of such coil. A strain gage 55 fastened at one end to the moving reflecting member, and anchored at its other end, has proved suitable as a feedback device for indicating the position of the reflecting member without inhibiting or damping the necessary rapid movement of the reflecting member.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. Apparatus for recording a sequence of frames through a single lens system along different optical axes which converge at a recording station and at a predetermined location in a scene to be recorded, comprising
   means defining a recording station
   recording control means providing for sequentially recording scenes focused at said recording station,
   a lens system including at least two axially aligned spaced lens sections having a field of view encompassing scenes to be recorded and defining an optical path along which light rays pass from a scene and exit said lens system to focus at said recording station,
   light shifting means mounted within said lens system between said lens sections and arranged to shift said optical path within said lens system cyclically between at least two different non-parallel axes which intersect at a predetermined location in a scene viewed by said lens system, and
   focus control means operable to move at least one of said lens sections axially for dynamically changing the intersection location of the axes of the different optical paths as the recording of scenes proceeds.

2. Apparatus as defined in claim 1,
   said light shifting means comprising a light refracting member,
   means for shifting said refracting member between two positions relative to the common axis in cyclic fashion synchronized to said recording control means.

3. Apparatus as defined in claim 2,
   including means mounting said refracting member for rotation in a circular path which intersects the optical path so as to move said refracting member into and out of the optical path,
   mean rotating said mounting means in synchronism with said recording control means, and
   said focus control means having a connection to said rotating means to vary the angle of intersection between the optical path and the circular path followed by said refracting member.

4. Apparatus as defined in claim 1, wherein
   said light shifting means is an aperture piece including an aperture therein stopped to a fraction of the aperture of said lens system for controlling a light path,
   means mounting said aperture piece within said lens system between said lens sections intersecting the centerline thereof and movable transversely of such centerline, and
   motor means arranged to shift said aperture piece cyclically between at least two different viewing positions on opposite sides of such centerline to define different optical paths through said lens system.

5. Apparatus as defined in claim 4, wherein said mounting means is arranged for guiding said aperture piece along a horizontal path intersecting the centerline of said lens system.

6. Apparatus as defined in claim 4 wherein said mounting means is arranged for guiding said aperture piece along a path which is at an angle of less than 30° with respect to a horizontal line intersecting the lens system centerline to introduce some vertical as well as horizontal disparity between the different viewing positions.

7. Apparatus for shifting the light path from a scene to be recorded via a lens system to a recording station where frames of the scene are recorded in a predetermined sequence; comprising,
   a multi-section lens system having at least two axially spaced and coaxially arranged lens sections defining an optical path,
   light shifting means located between said lens sections and intersecting the optical path and redirecting such path in cyclic fashion with respect to the scene recording sequence along a plurality of non-parallel axes which intersect at a predetermined location in the scene,
   focus control means acting on at least one of said lens sections for dynamically changing the intersection location of the axes of the different optical paths as recording of the scene proceeds,
   a servo motor in said light shifting means and arranged to provide an output movement for redirecting the optical path,
   a servo amplifier driving said servo motor, and
   means for providing control pulses synchronized with the frame recording rate to said servo amplifier.

8. Apparatus as defined in claim 7, including
   said means for providing control pulses including a detector means sensing the frame recording rate and divider means for generating from the detector means a string of control pulses which are an integral division of the frame recording rate and equal to the number of frames to be recorded at any given position of said light shifting means.

* * * * *